(12) United States Patent
Ohno et al.

(10) Patent No.: US 11,268,797 B2
(45) Date of Patent: Mar. 8, 2022

(54) GAUGE INSPECTION JIG AND GAUGE INSPECTOR

(71) Applicant: Mitutoyo Corporation, Kanagawa (JP)

(72) Inventors: Teppei Ohno, Gifu (JP); Mao Kikuchi, Gifu (JP)

(73) Assignee: Mitutoyo Corporation, Kanagawa (JP)

( * ) Notice: Subject to any disclaimer, the term of this patent is extended or adjusted under 35 U.S.C. 154(b) by 204 days.

(21) Appl. No.: 16/805,474

(22) Filed: Feb. 28, 2020

(65) Prior Publication Data

US 2020/0278188 A1 Sep. 3, 2020

(30) Foreign Application Priority Data

Feb. 28, 2019 (JP) .............................. JP2019-036090

(51) Int. Cl.
*G01B 3/22* (2006.01)
*G01B 3/00* (2006.01)

(52) U.S. Cl.
CPC ............... *G01B 3/002* (2013.01); *G01B 3/22* (2013.01)

(58) Field of Classification Search
CPC .................................. G01B 3/002; G01B 3/22
USPC ..................................................... 33/832, 833
See application file for complete search history.

(56) References Cited

U.S. PATENT DOCUMENTS

| | | | | |
|---|---|---|---|---|
| 3,171,205 A | * | 3/1965 | Kurtz | G01B 11/0675 33/1 R |
| 4,176,461 A | * | 12/1979 | Gebel | G01B 5/201 33/501.05 |
| 4,875,294 A | * | 10/1989 | Jefferson | E05B 17/0016 33/539 |
| 5,421,101 A | * | 6/1995 | Rank | G01B 3/22 33/784 |
| 5,979,069 A | * | 11/1999 | Hayashida | G01B 3/22 33/556 |
| 6,839,978 B2 | * | 1/2005 | Allen | B23Q 17/2233 33/626 |
| 6,925,727 B2 | * | 8/2005 | Ishii | G01B 3/22 33/556 |
| 6,971,182 B1 | * | 12/2005 | Guffey | G01B 3/22 33/555 |
| 7,065,897 B2 | * | 6/2006 | Luner | G01B 3/28 29/407.05 |

(Continued)

FOREIGN PATENT DOCUMENTS

JP          2015-152581          8/2015

*Primary Examiner* — George B Bennett
(74) *Attorney, Agent, or Firm* — Oblon, McClelland, Maier & Neustadt, L.L.P.

(57) ABSTRACT

A coupling portion has one end coupleable to a distal end of a measurement spindle. The measurement spindle is disposed on a gauge inspector and movable in a measurement axis direction. A cylindrical stem is insertable into a gauge holding member to hold the inserted stem. The stem slidably holds a spindle having a distal end on which a contact point of a gauge is disposed. A frame has a first end coupled to a second end of the coupling portion and has a second end to which the gauge holding member is mountable. The gauge holding member is held to the frame such that an axis of the stem runs along the measurement axis direction. As a result, inspection is performed easily and accurately in a reverse posture with a contact point facing upward when a gauge is inspected.

14 Claims, 14 Drawing Sheets

(56) References Cited

U.S. PATENT DOCUMENTS

| | | | |
|---|---|---|---|
| 7,069,666 B2 * | 7/2006 | Navarro | B23Q 17/22 |
| | | | 33/626 |
| 8,266,810 B2 * | 9/2012 | Gordon | B23Q 17/2233 |
| | | | 33/502 |
| 9,103,645 B2 * | 8/2015 | Hayashi | G01B 5/00 |
| 9,551,559 B2 * | 1/2017 | Tschorn | G01B 5/012 |

* cited by examiner

GAUGE INSPECTION JIG AND GAUGE INSPECTOR

TECHNICAL FIELD

The present disclosure relates to a gauge inspection jig and a gauge inspector.

BACKGROUND ART

International standards by International Organization for Standardization (ISO) and Japanese Industrial Standards (JIS) specify a measurement property of a gauge, such as a dial gauge, such that an error of indication and repeatability of the gauge should be measured in a state in which the gauge is held in a plurality of different postures.

For example, it is specified that the measurement property, when not designated by a manufacturer, needs to meet values of a maximum permissible error (MPE) and a maximum permissible level (MPL) at any position in a measurement range and in any posture. Here, the maximum permissible error (MPE) of the gauge is the maximum value of the error of indication that is allowable for an indication value. The maximum permissible level (MPL) is a limit value of a measuring force as an allowable measuring force by specifications.

A typical example is a case where, for example, it is assumed that a user demands that the measurement can be performed in a posture other than a posture in which a contact point faces downward. Accordingly, the manufacturer requires a plan to allow the dial gauge to be inspected in the posture other than the posture in which the contact point faces downward.

For example, a gauge inspector that measures a measurement error and is repeatable in a state where a dial gauge is reversed up and down (reverse posture) has been proposed (Patent Document 1). In this gauge inspector, a part of a gauge where a cap is mounted is inserted into one end of a socket and a male thread disposed on the other end of the socket is screwed into a measurement spindle of the gauge inspector, thus holding the gauge in the reverse posture.

CITATION LIST

Patent Literature

Patent Document 1: JP 2015-152581 A

SUMMARY OF INVENTION

Technical Problem

However, depending on a type of the dial gauge, some dial gauges originally do not include caps. Therefore, the configuration that holds the dial gauge in the reverse posture according to Patent Document 1 cannot be applied to the dial gauge without the cap.

Therefore, there is a demand for a method that can hold a dial gauge in the reverse posture regardless of presence of a cap and enables performance of inspection in the reverse posture by the gauge inspector.

The disclosed embodiments have been made in view of the above circumstances, and an object of the disclosure is to easily and accurately inspect a gauge in a reverse posture with a contact point facing upward when the gauge is inspected.

Solution to Problem

A gauge inspection jig according to a first aspect of the disclosure includes a coupling portion, a gauge holding member, and a body member. The coupling portion has one end coupleable to a distal end of a measurement spindle. The measurement spindle is disposed on a gauge inspector and movable in a measurement axis direction. Into the gauge holding member, a cylindrical stem is insertable to hold the inserted stem. The stem slidably holds a spindle having a distal end on which a contact point of a gauge is disposed. The body member has one end coupled to another end of the coupling portion and another end to which the gauge holding member is mountable. The gauge holding member is held to the body member such that an axis of the stem runs along the measurement axis direction.

A gauge inspection jig according to a second aspect of the disclosure is the above-described gauge inspection jig preferably as follows. The body member includes: a first beam extending in a second direction orthogonal to a first direction as the measurement axis direction; a first column having one end coupled to one end of the first beam and extending along the first direction; and a second beam extending from another end of the first column along the second direction. The gauge holding member is fixed on a surface of the second beam orientated in an extending direction of the first column without interference to the second beam by the stem.

A gauge inspection jig according to a third aspect of the disclosure is the above-described gauge inspection jig preferably as follows. The body member includes: a second column having one end coupled to another end of the first beam and extending along the first direction; and a third beam extending from another end of the second column in a direction opposite to an extending direction of the first beam. The gauge holding member is fixed on a surface of the third beam orientated in an extending direction of the second column without interference to the third beam by the stem.

A gauge inspection jig according to a fourth aspect of the disclosure is the above-described gauge inspection jig preferably as follows. The gauge holding member is held such that the stem is inserted into a clearance between the second beam and the third beam.

A gauge inspection jig according to a fifth aspect of the disclosure is the above-described gauge inspection jig preferably as follows. The gauge holding member includes first and second plate-shaped members having surfaces perpendicular to the first direction as principal surfaces. The first plate-shaped member has a first notch along the cylindrical shape of the stem. The second plate-shaped member has a second notch along the cylindrical shape of the stem. The stem inserted into a region formed by the first notch and the second notch is sandwiched between the first notch and the second notch to hold the stem.

A gauge inspection jig according to a sixth aspect of the disclosure is the above-described gauge inspection jig preferably as follows. In the first and the second plate-shaped members, female threads extending in a direction parallel to a surface perpendicular the first direction are disposed. Screwing into the female threads across the first and the second plate-shaped members couples the first plate-shaped member and the second plate-shaped member together.

A gauge inspector according to a seventh aspect of the disclosure includes a measurement spindle and a fixing portion. The measurement spindle is movable in a measurement axis direction. The fixing portion is configured to fix a member contacted by a contact point of a gauge held in a reverse posture by a gauge inspection jig. The gauge inspection jig includes: a coupling portion having one end coupleable to a distal end of the measurement spindle; a gauge holding member into which a cylindrical stem is insertable to hold the inserted stem, the stem slidably holding a spindle having a distal end on which the contact point of the gauge is disposed; and a body member having one end coupled to another end of the coupling portion and another end to which the gauge holding member is mountable. The gauge holding member is held to the body member such that an axis of the stem runs along the measurement axis direction.

Advantageous Effects

According to the embodiments of the disclosure, it is possible to easily and accurately inspect the gauge in the reverse posture with the contact point facing upward when the gauge is inspected.

The foregoing and other objects, features, and advantages of the embodiments of the disclosure will be further fully understood from the following detailed description and the accompanying drawings. The accompanying drawings are illustrated for understanding and do not intend to limit the disclosure.

DESCRIPTION OF EMBODIMENTS

Figure 1:
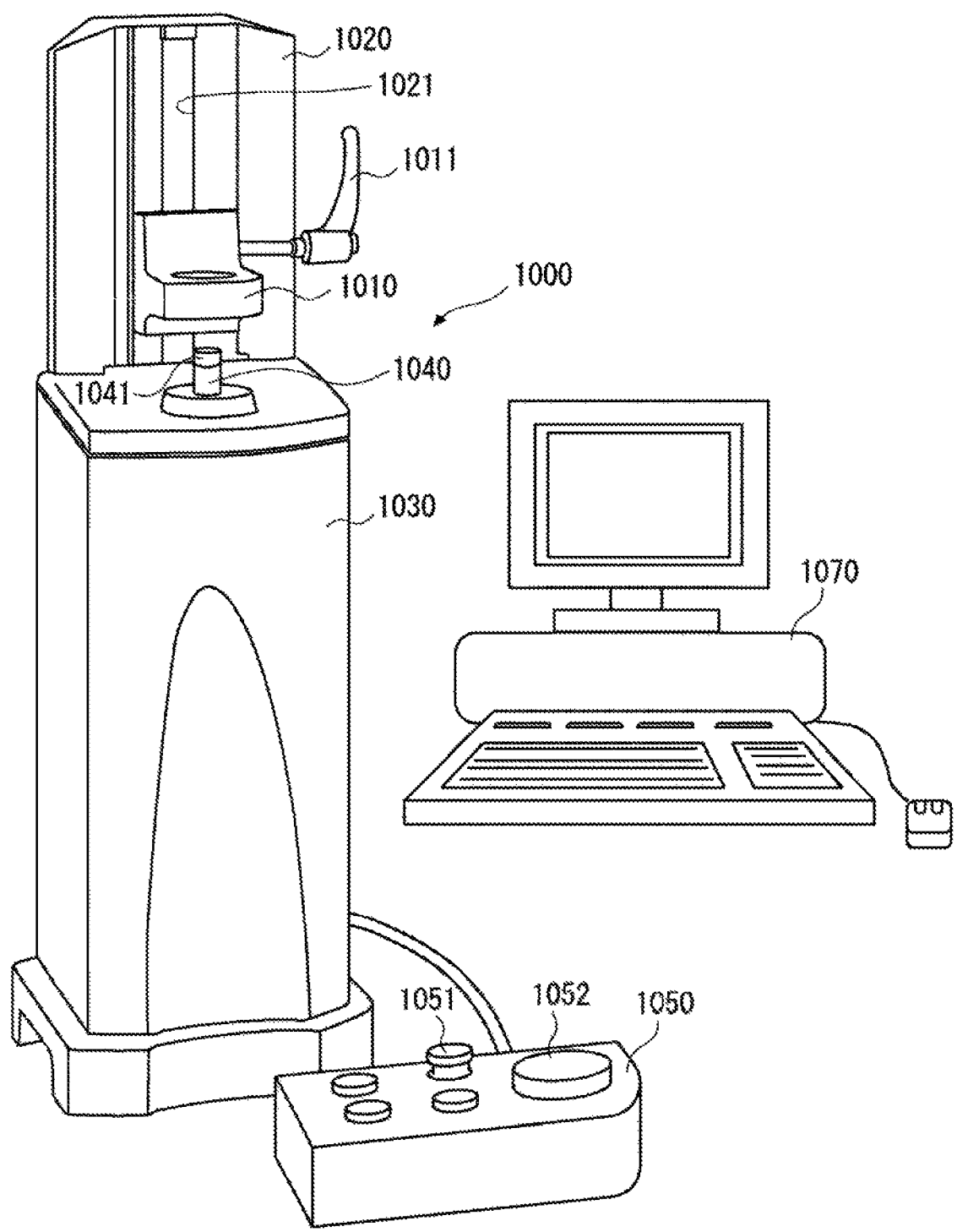
FIG. 1 is a diagram illustrating an appearance of a gauge inspector.

Hereinafter, embodiments of the disclosure will be described with reference to the drawings. In the respective drawings, the same reference numerals are given to the same components, and overlapped descriptions thereof are omitted as necessary.

First Embodiment

Figure 2:
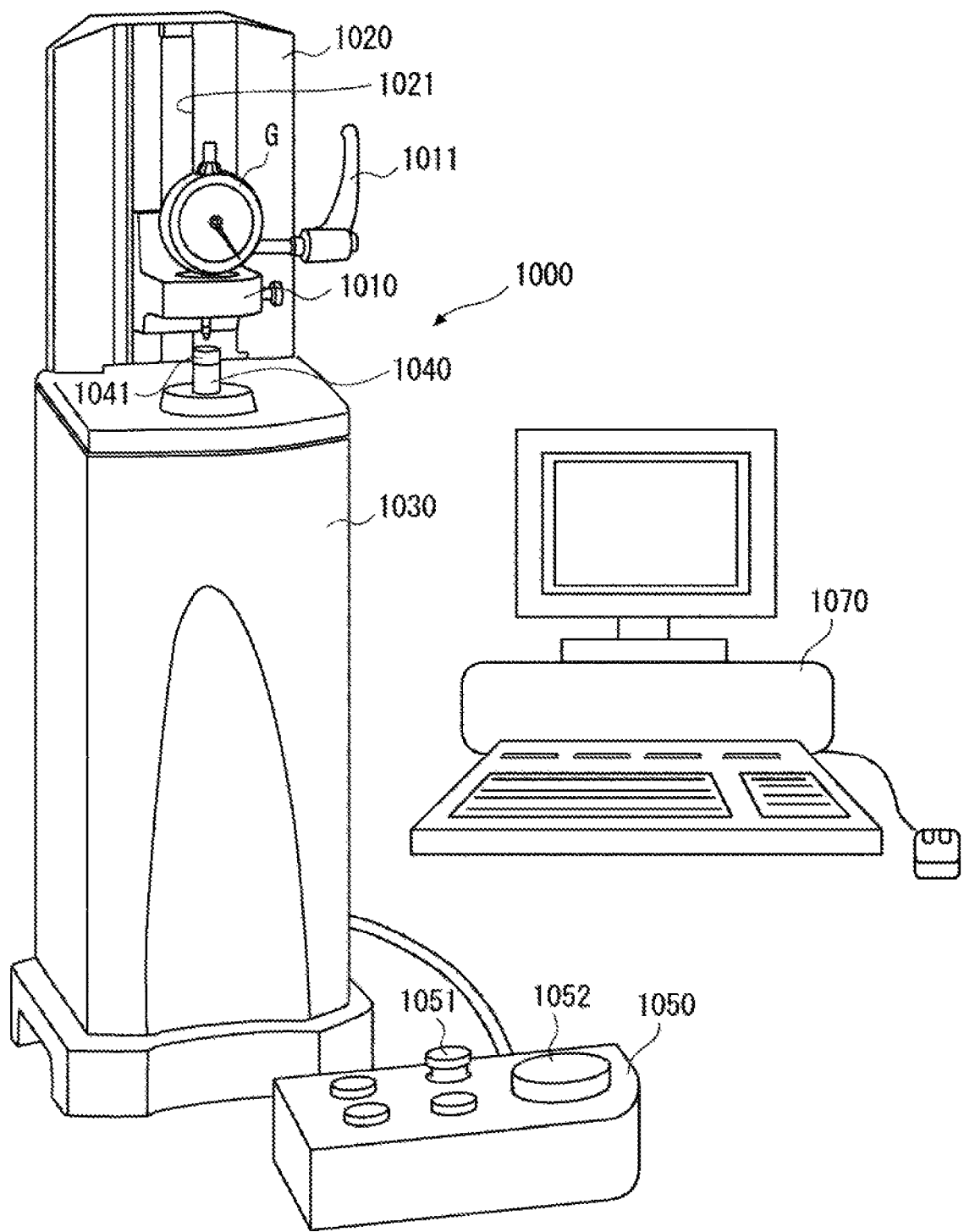
FIG. 2 is a diagram illustrating a state in which a gauge is set to the gauge inspector in a usual posture.

A gauge inspector will be described. FIG. 1 illustrates an appearance of a gauge inspector 1000. FIG. 2 illustrates a state in which a gauge G is set to the gauge inspector 1000 in a usual posture.

The gauge inspector 1000 has a bracket portion 1010 that fixedly holds the gauge G. A stem ST of the gauge G is inserted into the bracket portion 1010, and thus the bracket portion 1010 can fixedly hold the gauge G. Since the gauges G have various sizes, the bracket portion 1010 is disposed to freely move up and down in a height direction (a measurement axis direction, that is, a Z direction described later, and also referred to as a first direction) so as to change its position.

In this example, a backboard 1020 is disposed upright on a housing 1030. A guide rail 1021 guiding the bracket portion 1010 is disposed on the backboard 1020. Thus, the bracket portion 1010 is held to freely move up and down along the guide rail 1021, in short, to be movable in an up-down direction. The position of the bracket portion 1010 can be fixed by operating a handle 1011.

An operation of the gauge inspector 1000 is controlled by a computer 1070. The computer 1070 can also store measurement results by the gauge inspector 1000. When the gauge inspector 1000 is manually operated, such as for adjustment of the position of a measurement spindle 1040, for example, a user can operate a switch 1051 and a jog dial 1052 on an operating unit 1050.

Figure 3:
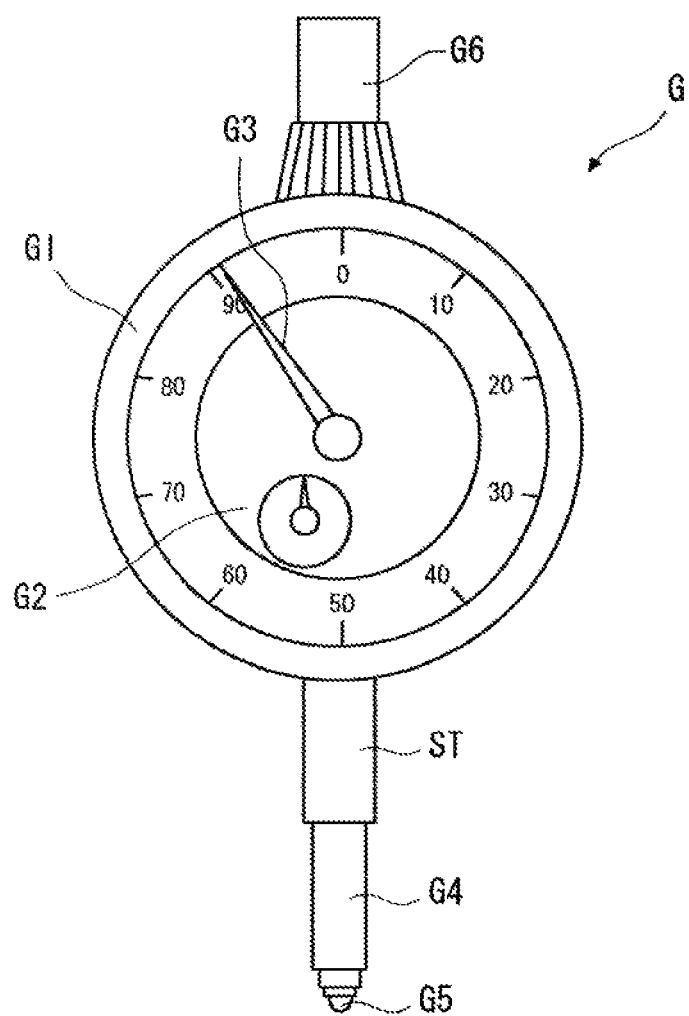
FIG. 3 is a diagram illustrating a configuration example of the gauge.
Figure 4:
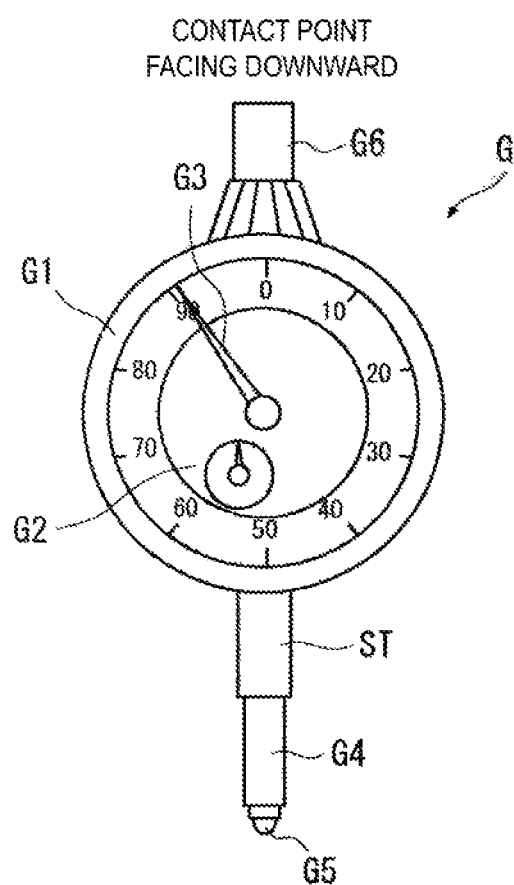
FIG. 4 is a diagram illustrating the gauge with a contact point facing downward (usual posture).
Figure 5:
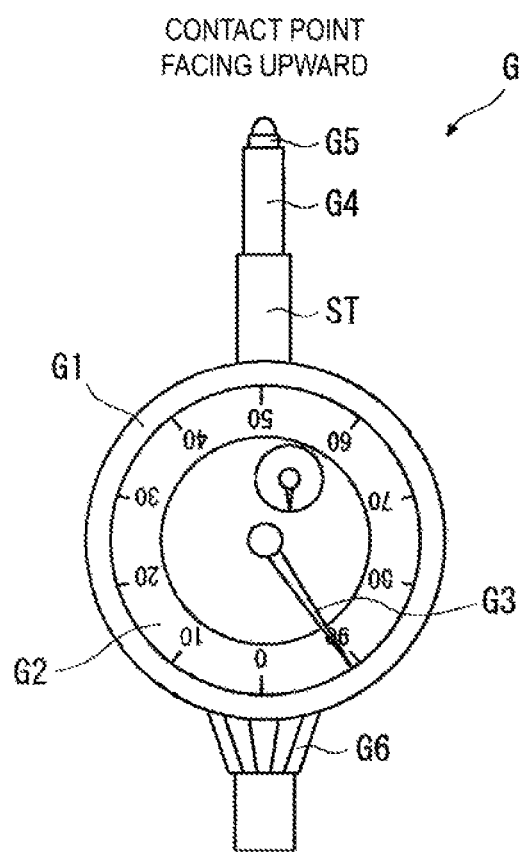
FIG. 5 is a diagram illustrating the gauge with the contact point facing upward (reverse posture).
Figure 6:
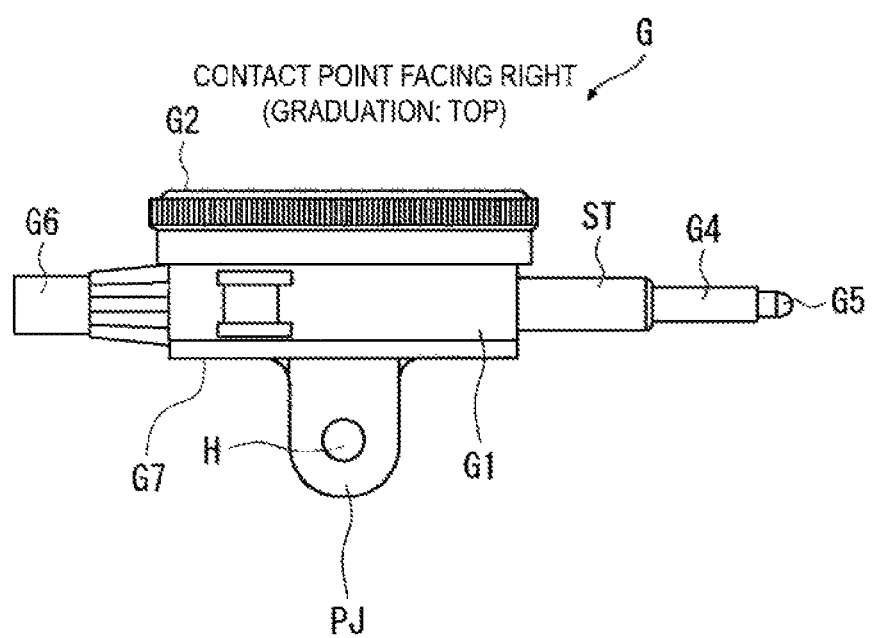
FIG. 6 is a diagram illustrating the gauge with the contact point facing right (note that a graduation faces upward).
Figure 7:
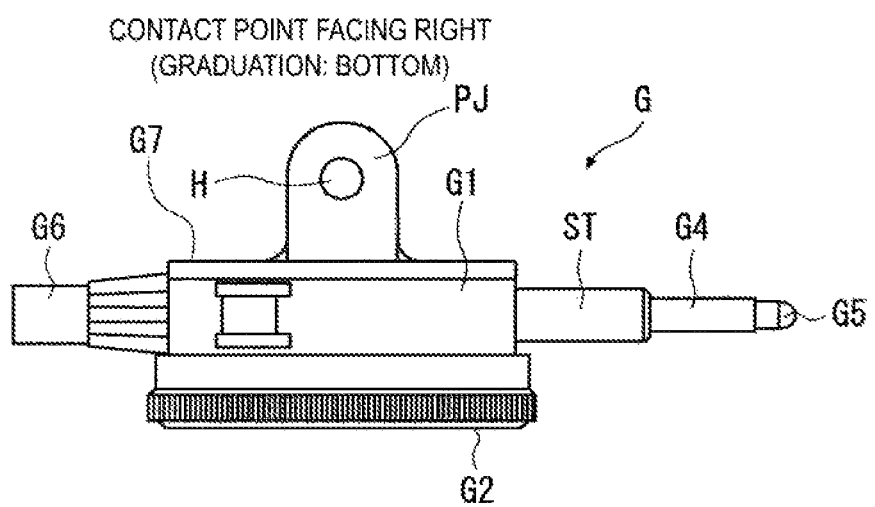
FIG. 7 is a diagram illustrating the gauge with the contact point facing right (note that the graduation faces downward).
Figure 8:
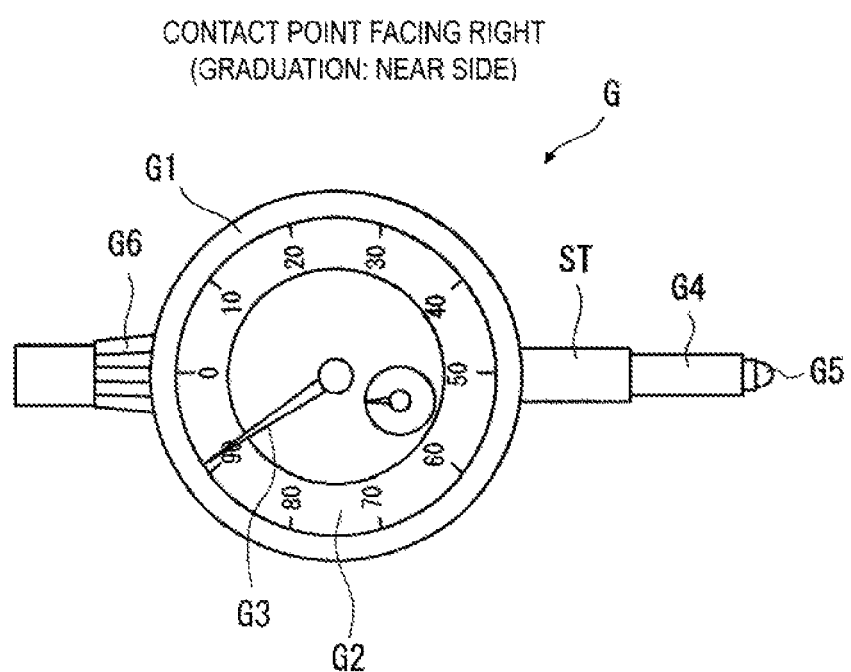
FIG. 8 is a diagram illustrating the gauge with the contact point facing right (note that the graduation faces a near side).
Figure 9:
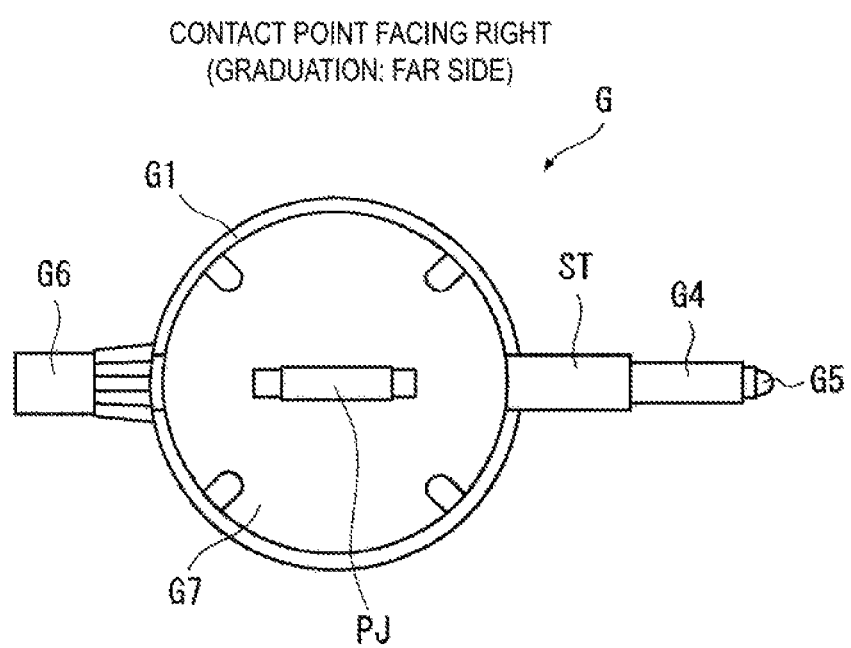
FIG. 9 is a diagram illustrating the gauge with the contact point facing right (note that the graduation faces a far side).

A configuration example of the gauge G will be described. FIG. 3 is a front view of the gauge G. The gauge G includes a cylindrical housing portion G1, a spindle G4 disposed to freely move up and down, and the stem ST projecting from the housing portion G1. A dial (display unit) G2 is disposed on a front surface of the housing portion G1. Inside the housing portion G1, a gear mechanism (not illustrated) that expands a displacement of the spindle G4 and delivers the displacement to an indicator needle G3 is disposed. The spindle G4 has a lower end to which a contact point G5 is disposed. The stem ST slidably supports the spindle G4. The spindle G4 passes through the housing portion G1, and an upper end of the spindle G4 protrudes from the housing portion G1. To protect the upper end portion of the spindle G4, a cap 06 is disposed on a side surface of the housing portion G1.

In addition, a back lid G7 is disposed on a side opposite to the surface (first surface) on which the dial G2 is disposed in the gauge G. A lug PJ protrudes from a surface (second surface) of the back lid G7 in a direction (second direction) perpendicular to the surface. The lug PJ is provided with a hole H penetrating in a direction orthogonal to a direction (second direction) perpendicular to the measurement axis direction and the surface of the back lid G7.

Next, an inspection posture of the gauge will be described. For example, according to a demand from, for instance, the user, a case where the gauge needs to be inspected in various postures other than the usual posture (contact point facing downward) illustrated in FIG. 2 is assumed. Considering, for example, an internal structure of the gauge G, it is considered that the inspection posture of the gauge can be classified into the following six patterns.

The following describes the six patterns of the inspection postures with reference to FIG. 4 to FIG. 9.

(A) Contact point facing downward (usual posture)

(B) Contact point facing upward (reverse posture)

(C) Contact point facing right (Note that a graduation faces upward.)

(D) Contact point facing right (Note that the graduation faces downward.)

(E) Contact point facing right (Note that the graduation faces a near side.)

(F) Contact point facing right (Note that the graduation faces a far side.)

Note that, in the following, "near side" may also be referred to as "front." and "far side" is also referred to as "rear."

According to the posture used by the user, the inspection in one or two or more postures among the six patterns is performed. Note that it is clear that the inspection on the gauge G in the usual posture, which is "(A) Contact point facing downward," can be performed by the original inspection method by the gauge inspector, and therefore the description of the inspection in the usual posture will be omitted in the present embodiment.

In the present embodiment, the inspection of the above-described "(B) Contact point facing upward (reverse posture)" (hereinafter referred to as a reverse posture inspection) will be described. In the present embodiment, the reverse posture inspection is achieved using a jig to set the gauge G to the gauge inspector 1000 in the reverse posture.

Figure 10:
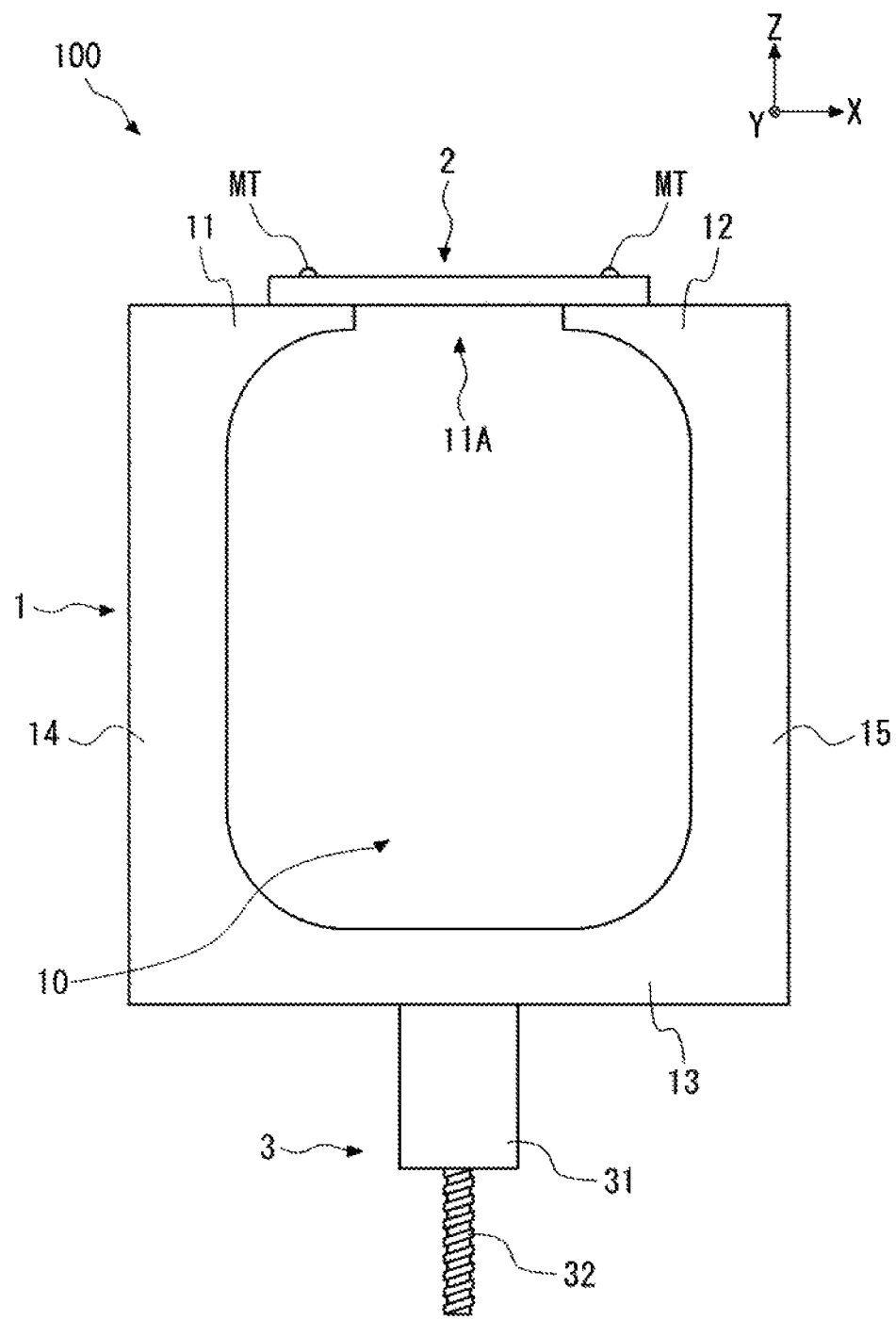
FIG. 10 is a diagram schematically illustrating a configuration of a gauge inspection jig according to a first embodiment.
Figure 11:
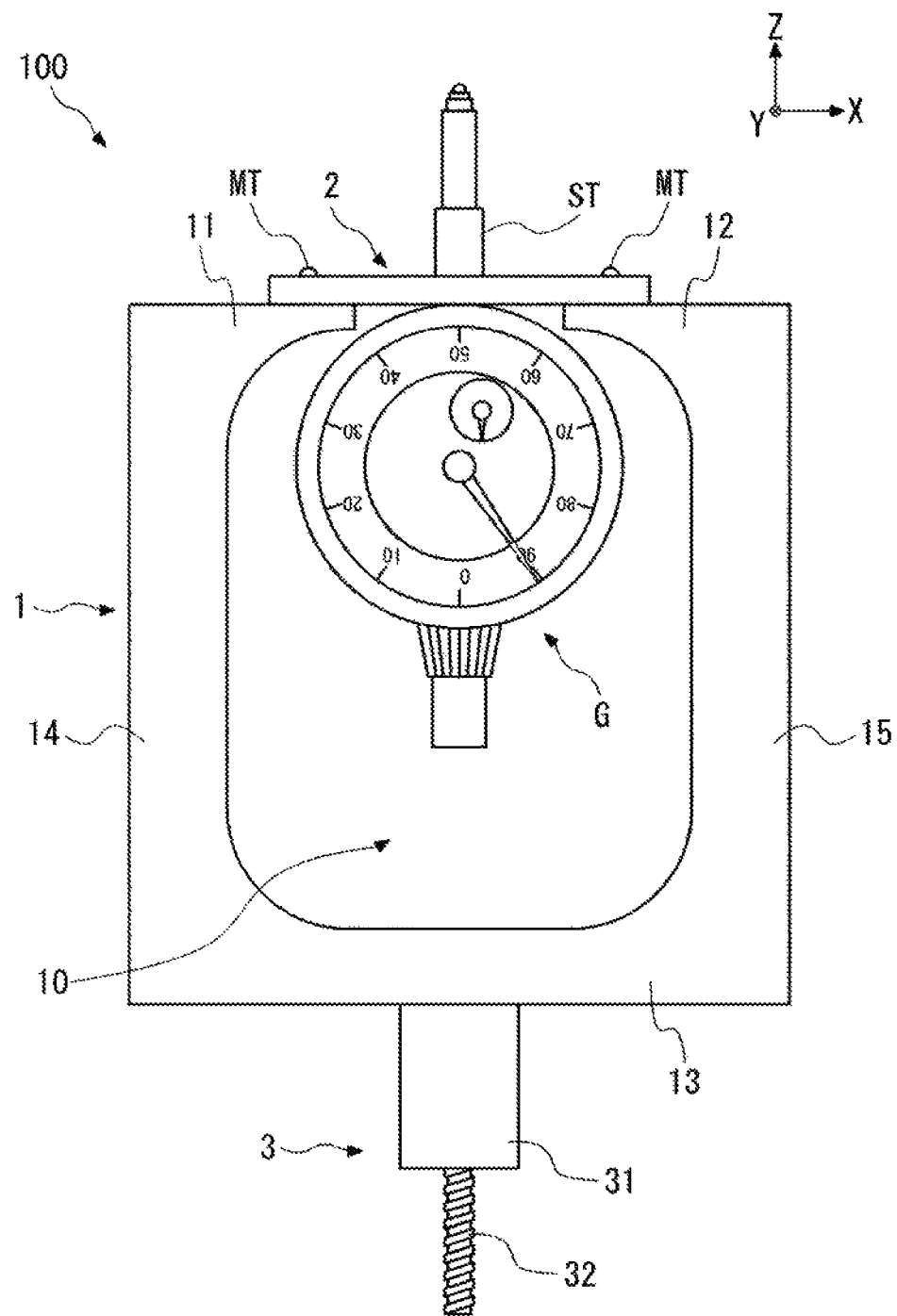
FIG. 11 is a diagram schematically illustrating a case where the gauge is set to the gauge inspection jig according to the first embodiment in the reverse posture.

A gauge inspection jig 100 will be described. FIG. 10 schematically illustrates a configuration of the gauge inspection jig 100 according to the first embodiment. FIG. 11 schematically illustrates a case where the gauge G is set to the gauge inspection jig 100 according to the first embodiment in a reverse posture. The gauge inspection jig 100 includes a frame 1, a gauge holding member 2, and a coupling portion 3.

The frame 1 is configured as a frame-shaped body member having a hollow portion 10 bored in a Y direction (second direction) in a flat plate-shaped member having a Z-X plane parallel to an axis direction (Z direction) as a principal surface. Note that the frame 1 is preferably configured to be of a material having high rigidity, such as a metal.

A center portion of beams extending in the X direction on an upper side (Z (+) side) of the frame 1 is provided with an opening 11A. In other words, the opening 11A is interposed between a distal end of a beam 11 (second beam) extending from the X (−) side to the X (+) side and a distal end of a beam 12 (third beam) extending from the X (+) side to the X (−) side.

A beam 13 (first beam) extending in the X direction is disposed at the bottom of the frame 1. Between an upper surface at an end portion on the left side (X (−) side) of the beam 13 and an end portion on the left side (X (−) side) of the beam 11 is coupled with a column 14 (first column) extending in the Z direction. Between an upper surface at an end portion on the right side (X (+) side) of the beam 13 and an end portion on the right side (X (+) side) of the beam 12 is coupled with a column 15 (second column) extending in the Z direction. [0036]1 The coupling portion 3 includes a columnar member 31 and a male thread 32. The columnar member 31 is a member protruding from a lower surface (a surface on the Z (−) side) of the beam 13 of the frame 1 to the lower side (Z (−) side). The male thread 32 extends downward (Z (−) direction) from a lower end (an end portion on the Z (−) side) of the columnar member 31.

The gauge holding member 2 is placed on the opening 11A of the frame 1. The stem ST of the gauge G is inserted through the gauge holding member 2 to ensure holding of the stem ST. The gauge holding member 2 is, for example, fixed to the beams 11 and 12 by fixing means, such as male screws MT.

Figure 12:
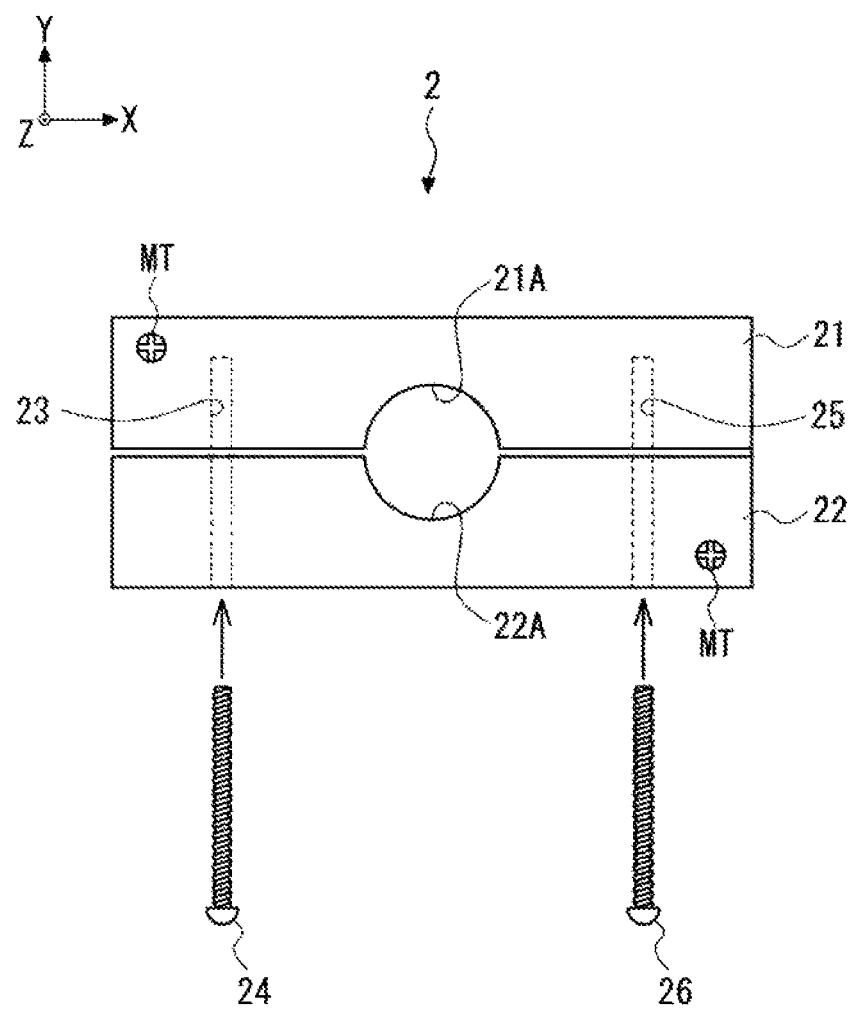
FIG. 12 is a diagram schematically illustrating a configuration of a gauge holding member of the gauge inspection jig according to the first embodiment when viewed from a measurement axis direction.

FIG. 12 schematically illustrates a configuration of the gauge holding member 2 when viewed from the measurement axis direction. The gauge holding member 2 includes two plate-shaped members 21 and 22 (first and second plate-shaped members) having an X-Y plane as principal surfaces. The plate-shaped members 21 and 22 are preferably configured to be of a material having high rigidity, such as a metal. The plate-shaped members are arranged in the Y direction orthogonal to the X direction, which is the direction in which the beams 11 and 12 extend. On opposed side surfaces of the plate-shaped members 21 and 22, respective semi-circular notches 21A and 22A (first and second notches), into which the stem ST is inserted, are formed.

Figure 13:
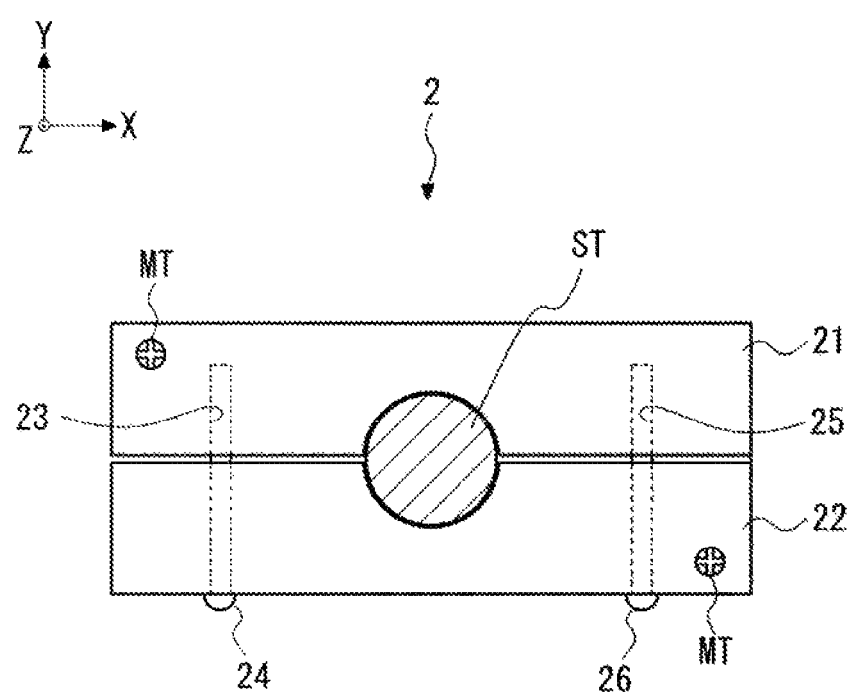
FIG. 13 is a diagram schematically illustrating the configuration of the gauge holding member according to the first embodiment when viewed from the measurement axis direction.

The plate-shaped members 21 and 22 include, for example, female threads 23 and 25 extending in the Y direction such that the notches 21A and 22A are interposed between the female threads 23 and 25. Male threads 24 and 26 are each screwed with the female threads 23 and 25, and thus the plate-shaped members 21 and 22 can be coupled together and held with the stem ST sandwiched between them. FIG. 13 illustrates the stem ST held by the gauge holding member 2.

Figure 14:
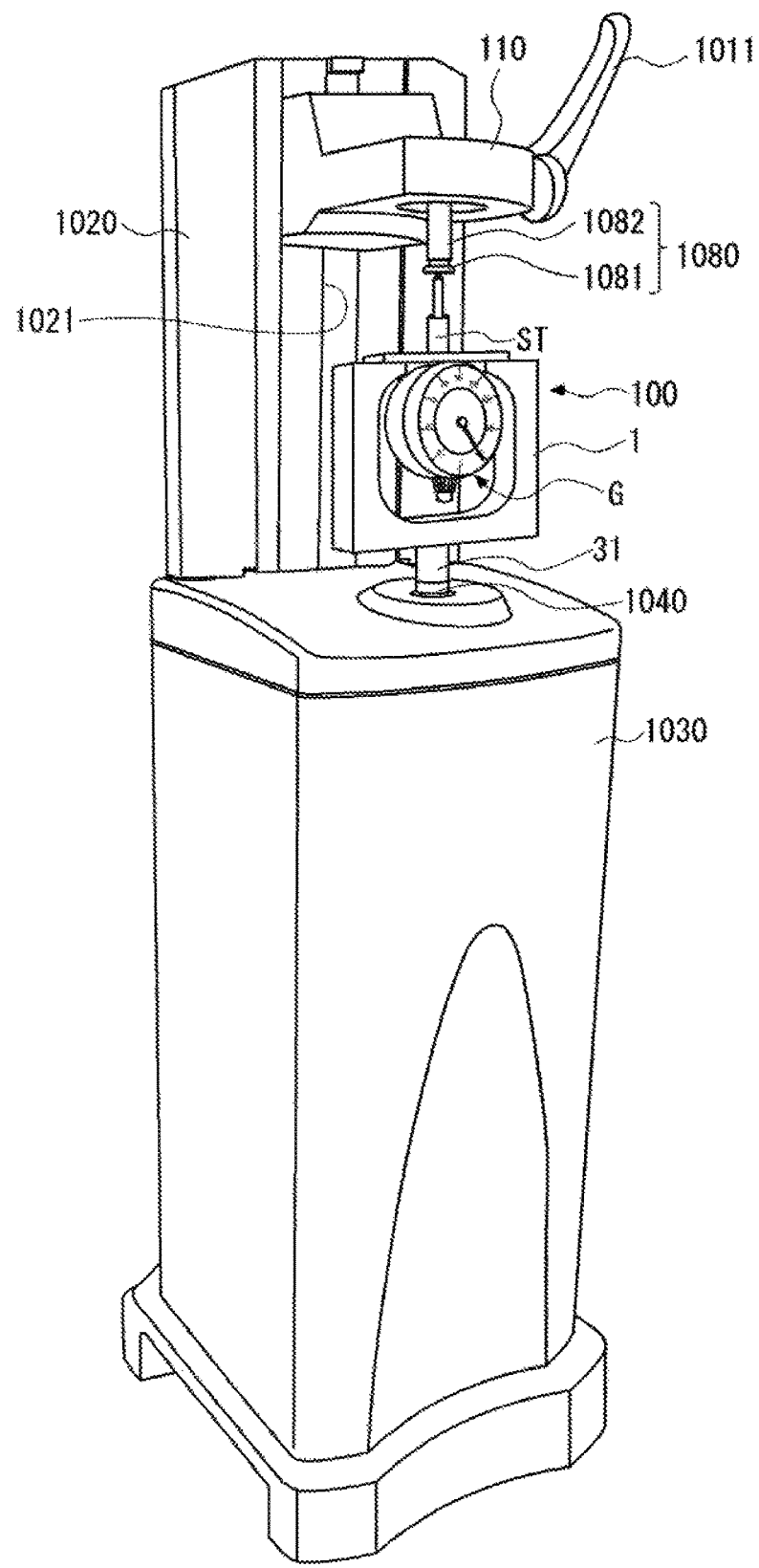
FIG. 14 is a diagram illustrating a method for fixing a coupling portion of the gauge inspection jig according to the first embodiment to a measurement spindle.

Next, a method for performing the inspection with "(B) Contact point facing upward" will be described. FIG. 14 illustrates a method of fixing the coupling portion 3 to the measurement spindle 1040. The male thread 32 of the coupling portion 3 is screwed into the measurement spindle 1040 instead of a flat contact point 1041. This fixes the columnar member 31 to the measurement spindle 1040.

Thus, the gauge inspection jig 100 can move up and down in conjunction with an up and down movement of the measurement spindle 1040. That is, setting the gauge G to the gauge holding member 2 in the reverse posture allows the gauge, G in the reverse posture, to be moved up and down in the measurement axis direction (Z direction). It is desirable that the bracket portion 1010 be moved sufficiently upward so that the bracket portion 1010 does not interfere with the gauge inspection jig 100 and the gauge G.

When the gauge G is set to the gauge inspector 1000 in the reverse posture, a member for bringing the contact point G5 of the gauge G into contact can be disposed on the gauge inspector 1000. In the present embodiment, a contact member 1080, with which the contact point G5 is in contact, is mounted to the bracket portion 1010. The contact member 1080 includes a measurement table 1081 and a shaft member 1082.

The shaft member 1082 is a member extending in the Z direction and is held by the bracket portion 1010 to protrude to the lower side (Z (−) side). The shaft member 1082 has a lower end (an end portion on the Z (−) side) to which the measurement table 1081 is mounted. The surface on the lower side (Z (−) side) of the measurement table 1081 is configured as a flat surface (X-Y plane), and the flat surface contacts the contact point G5.

As described above, the gauge G is set to the gauge inspection jig 100 in the reverse posture and the measurement spindle 1040 is moved up and down to bring the contact point G5 in contact with the measurement table 1081, thus inserting the spindle G4. Accordingly, indication accuracy and repeatability of the gauge in the reverse posture can be measured.

Other Embodiments

The disclosure is not intended to be limited to the above-described embodiments, and appropriate variations can be made thereon without departing from the essential spirit of the disclosure. For example, while the frame 1 has been described as a single member in the embodiments described above, the frame 1 may be configured by coupling a plurality of members together. To hold the gauge G in the reverse posture and perform the inspection with high accuracy, the frame 1 is preferably configured as one member.

While the frame 1 has been described as a member having the hollow portion 10, this is merely an example. For example, as long as the gauge holding member can be held, a member having a shape in which one of the columns 14 and 15 of the frame 1 is removed or another shape, such as an L-shaped shape, may be used.

REFERENCE SIGNS LIST

1 Frame
2 Gauge holding member
3 Coupling portion
10 Hollow portion
11 to 13 Beam
11A Opening
14, 15 Column
21, 41, 51 Plate-shaped member
31 Columnar member
24, 26, 32 Male thread
100 Gauge inspection jig
1000 Gauge inspector
1010 Bracket portion
1011 Handle
1020 Backboard
1021 Guide rail
1030 Housing
1040 Measurement spindle
1041 Flat contact point
1050 Operating unit
1051 Switch
1052 Jog dial
1070 Computer
1080 Contact member
1081 Measurement table
1082 Shaft member
G Gauge
G1 Housing portion
G2 Dial
G3 Indicator needle
G4 Spindle
G5 Contact point
G6 Cap
G7 Back lid
H Hole
PJ Lug
ST Stem

The invention claimed is:

1. A gauge inspection jig, comprising:
a coupling portion having a first end coupleable to a distal end of a measurement spindle, the measurement spindle being disposed on a gauge inspector and movable in a measurement axis direction;
a gauge holding member into which a cylindrical stem is insertable to hold the inserted cylindrical stem, the cylindrical stem slidably holding a spindle having a distal end on which a contact point of a gauge is disposed; and
a body member having a first end coupled to a second end of the coupling portion and having a second end to which the gauge holding member is mountable, wherein
the gauge holding member is held to the body member such that an axis of the cylindrical stem runs along the measurement axis direction.

2. The gauge inspection jig according to claim 1, wherein the body member includes:
a first beam extending in a second direction orthogonal to a first direction, the second direction being the measurement axis direction;
a first column having a first end coupled to a first end of the first beam and extending along the first direction; and
a second beam extending from a second end of the first column along the second direction, wherein
the gauge holding member is fixed on a surface of the second beam orientated in an extending direction of the first column such that the cylindrical stem does not interfere with the second beam.

3. The gauge inspection jig according to claim 2, wherein the body member includes:
a second column having a first end coupled to the first end of the first beam and extending along the first direction; and
a third beam extending from a second end of the second column in a direction opposite to an extending direction of the first beam, wherein
the gauge holding member is fixed on a surface of the third beam orientated in an extending direction of the second column such that the cylindrical stem does not interfere with the third beam.

4. The gauge inspection jig according to claim 3, wherein the gauge holding member is held such that the cylindrical stem is inserted into a clearance between the second beam and the third beam.

5. The gauge inspection jig according to claim 3, wherein the gauge holding member includes
first and second plate-shaped members having surfaces perpendicular to the first direction, the surfaces being principal surfaces, wherein
the first plate-shaped member has a first notch along a cylindrical shape of the cylindrical stem,
the second plate-shaped member has a second notch along the cylindrical shape of the cylindrical stem, and
the cylindrical stem inserted into a region formed by the first notch and the second notch is sandwiched between the first notch and the second notch to hold the cylindrical stem.

6. The gauge inspection jig according to claim 5, wherein
in the first and the second plate-shaped members, female threads extending in a direction parallel to a surface perpendicular the first direction are disposed, and
wherein screwing into the female threads across the first and the second plate-shaped members couples the first plate-shaped member and the second plate-shaped member together.

7. The gauge inspection jig according to claim 4, wherein the gauge holding member includes
first and second plate-shaped members having surfaces perpendicular to the first direction, the surfaces being principal surfaces, wherein
the first plate-shaped member has a first notch along a cylindrical shape of the cylindrical stem,
the second plate-shaped member has a second notch along the cylindrical shape of the cylindrical stem, and the cylindrical stem inserted into a region formed by the first notch and the second notch is sandwiched between the first notch and the second notch to hold the cylindrical stem.

8. A gauge inspector, comprising:

a measurement spindle movable in a measurement axis direction; and a fixing portion configured to fix a member contacted by a contact point of a gauge held in a reverse posture by a gauge inspection jig, wherein the gauge inspection jig includes:

a coupling portion having a first end coupleable to a distal end of the measurement spindle;

a gauge holding member into which a cylindrical stem is insertable to hold the inserted cylindrical stem, the cylindrical stem slidably holding a spindle having a distal end on which the contact point of the gauge is disposed; and a body member having a first end coupled to a second end of the coupling portion and having a second end to which the gauge holding member is mountable, wherein the gauge holding member is held to the body member such that an axis of the cylindrical stem runs along the measurement axis direction.

9. The gauge inspector according to claim 8, wherein the body member includes:

a first beam extending in a second direction orthogonal to a first direction, the second direction being the measurement axis direction;

a first column having a first end coupled to a first end of the first beam and extending along the first direction; and a second beam extending from a second end of the first column along the second direction, wherein the gauge holding member is fixed on a surface of the second beam orientated in an extending direction of the first column such that the cylindrical stem does not interfere with the second beam.

10. The gauge inspector according to claim 9, wherein the body member includes:

a second column having a first end coupled to the first end of the first beam and extending along the first direction; and a third beam extending from a second end of the second column in a direction opposite to an extending direction of the first beam, wherein the gauge holding member is fixed on a surface of the third beam orientated in an extending direction of the second column such that the cylindrical stem does not interfere with the third beam.

11. The gauge inspector according to claim 10, wherein the gauge holding member is held such that the cylindrical stem is inserted into a clearance between the second beam and the third beam.

12. The gauge inspector according to claim 10, wherein the gauge holding member includes first and second plate-shaped members having surfaces perpendicular to the first direction, the surfaces being principal surfaces, wherein the first plate-shaped member has a first notch along a cylindrical shape of the cylindrical stem, the second plate-shaped member has a second notch along the cylindrical shape of the cylindrical stem, and the cylindrical stem inserted into a region formed by the first notch and the second notch is sandwiched between the first notch and the second notch to hold the cylindrical stem.

13. The gauge inspector according to claim 12, wherein in the first and the second plate-shaped members, female threads extending in a direction parallel to a surface perpendicular the first direction are disposed, and wherein screwing into the female threads across the first and the second plate-shaped members couples the first plate-shaped member and the second plate-shaped member together.

14. The gauge inspector according to claim 11, wherein the gauge holding member includes first and second plate-shaped members having surfaces perpendicular to the first direction, the surfaces being principal surfaces, wherein the first plate-shaped member has a first notch along a cylindrical shape of the cylindrical stem, the second plate-shaped member has a second notch along the cylindrical shape of the cylindrical stem, and the cylindrical stem inserted into a region formed by the first notch and the second notch is sandwiched between the first notch and the second notch to hold the cylindrical stem.

* * * * *